US011880859B1

(12) United States Patent
Lyon et al.

(10) Patent No.: US 11,880,859 B1
(45) Date of Patent: Jan. 23, 2024

(54) COUNTEROFFER FOR MARKET OFFER CODE FAILED VALIDATION

(71) Applicant: Wells Fargo Bank, N.A., San Francisco, CA (US)

(72) Inventors: Michael James Lyon, Everett, WA (US); Matthew Paul Anderson, Poncha Springs, CO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 113 days.

(21) Appl. No.: 16/949,672

(22) Filed: Nov. 10, 2020

(51) Int. Cl.
| | | |
|---|---|---|
| *G06Q 30/00* | (2023.01) | |
| *G06Q 30/0207* | (2023.01) | |
| *G06Q 30/018* | (2023.01) | |
| *G06Q 40/02* | (2023.01) | |
| *G06F 16/955* | (2019.01) | |
| *G06Q 10/107* | (2023.01) | |
| *G06F 3/04842* | (2022.01) | |
| *G06Q 50/00* | (2012.01) | |

(52) U.S. Cl.
CPC ..... *G06Q 30/0225* (2013.01); *G06F 16/9566* (2019.01); *G06Q 10/107* (2013.01); *G06Q 30/0185* (2013.01); *G06Q 30/0222* (2013.01); *G06Q 30/0224* (2013.01); *G06Q 40/02* (2013.01); *G06F 3/04842* (2013.01); *G06Q 50/01* (2013.01)

(58) Field of Classification Search
CPC ............ G06F 16/9566; G06F 3/04842; G06Q 10/107; G06Q 30/0185; G06Q 40/02; G06Q 50/01
See application file for complete search history.

(56) References Cited

U.S. PATENT DOCUMENTS

| | | |
|---|---|---|
| 6,497,360 B1 | 12/2002 | Schulze, Jr. |
| 8,032,410 B2 | 10/2011 | Main et al. |
| 8,419,532 B2 | 4/2013 | Meyerhofer |
| | (Continued) | |

OTHER PUBLICATIONS

"Reducing operational expenses by enticing Taxi passengers to use self-service mode", Voucherify, [Online]. Retrieved from the Internet: <URL: https://www.voucherify.io/customer/icabbi>, (Accessed Jun. 15, 2021), 8 pgs.

(Continued)

*Primary Examiner* — Alvin L Brown
(74) *Attorney, Agent, or Firm* — SCHWEGMAN LUNDBERG & WOESSNER, P.A.

(57) ABSTRACT

Various examples are directed to computer-implemented systems and methods for providing a unique market offer code and validation. A method includes generating an offer customized for an intended recipient, and sending the offer electronically to the intended recipient. The method further includes receiving a user selection of the offer, and displaying a landing web page on a graphical user interface (GUI) of a user device. A user selection of an action button on the landing web page is received, and a validation web page is displayed on the GUI, the validation web page including prompts for input of user information. The user information is evaluated to determine authenticity of the offer and to confirm identity of the user as the intended recipient. Upon determining that the user is not approved for the offer, access is provided to the user to an additional offer tailored to the user.

20 Claims, 10 Drawing Sheets

(56) References Cited

U.S. PATENT DOCUMENTS

| | | |
|---|---|---|
| 8,533,032 B2 | 9/2013 | Main et al. |
| 8,533,037 B2 | 9/2013 | Postrel |
| 8,712,830 B2 | 4/2014 | Barnett et al. |
| 8,775,243 B2 | 7/2014 | Gillenson et al. |
| 8,818,848 B2 | 8/2014 | Carpenter et al. |
| 8,996,035 B2 | 3/2015 | Busch |
| 8,996,401 B2 | 3/2015 | Li et al. |
| 9,373,124 B2 | 6/2016 | Slavin et al. |
| 10,096,039 B2 | 10/2018 | Kramer et al. |
| 10,102,509 B2 | 10/2018 | Arceneaux |
| 10,225,622 B2 | 3/2019 | Bhogal et al. |
| 10,235,702 B2 | 3/2019 | Walker et al. |
| 10,410,236 B2 | 9/2019 | Slavin et al. |
| 10,497,022 B2 | 12/2019 | Carlson et al. |
| 2002/0095333 A1 | 7/2002 | Jokinen et al. |
| 2003/0233278 A1 | 12/2003 | Marshall |
| 2008/0120155 A1 | 5/2008 | Pliha |
| 2011/0208656 A1 | 8/2011 | Alba et al. |
| 2012/0136702 A1 | 5/2012 | Fajkowski |
| 2012/0209673 A1 | 8/2012 | Park et al. |
| 2012/0296716 A1 | 11/2012 | Barbeau et al. |
| 2012/0310738 A1 | 12/2012 | Mesaros |
| 2013/0006751 A1 | 1/2013 | Bennett et al. |
| 2013/0085807 A1 | 4/2013 | Cincotta |
| 2013/0144738 A1 | 6/2013 | Qawami et al. |
| 2013/0151294 A1 | 6/2013 | Denker et al. |
| 2013/0332251 A1 | 12/2013 | Ioannidis et al. |
| 2014/0236690 A1 | 8/2014 | Barnett et al. |
| 2014/0278990 A1* | 9/2014 | Swanson ............ G06Q 30/0207 705/14.55 |
| 2016/0034940 A1 | 2/2016 | Vannoller et al. |
| 2016/0189193 A1 | 6/2016 | Toumayan et al. |
| 2018/0033035 A1 | 2/2018 | Chauhan |
| 2018/0181971 A1 | 6/2018 | MacIlwaine et al. |
| 2019/0073696 A1* | 3/2019 | Ericson ............... G06Q 30/0235 |
| 2019/0205925 A1* | 7/2019 | Swenson ............. G06Q 30/0247 |
| 2020/0005347 A1 | 1/2020 | Boal |
| 2020/0058051 A1 | 2/2020 | Carlson et al. |

OTHER PUBLICATIONS

"Unique Coupon Codes for Shopify", Klaviyo, [Online]. Retrieved from the Internet: <URL: https://help.klaviyo.com/hc/en-us/articles/115006155388-Unique-Coupon-Codes-for-Shopify#signupdownvote>, (Accessed Jun. 16, 2021), 11 pgs.

Chang, Chin-Chen, et al., "A Secure E-coupon System for Mobile Users", International Journal of Computer Science and Network Security, vol. 6 No.1, (Jan. 2006), 273-280.

Pathath, Ram Shasank, "Coupon Redemption System (Thesis)", University of Missouri-Kansas City, (2015), 46 pgs.

U.S. Appl. No. 16/949,671, filed Nov. 10, 2020, Unique Market Offer Code and Validation.

"U.S. Appl. No. 16/949,671, Advisory Action dated Aug. 17, 2022", 3 pgs.

"U.S. Appl. No. 16/949,671, Final Office Action dated May 18, 2022".

"U.S. Appl. No. 16/949,671, Non Final Office Action dated Jan. 21, 2022".

"U.S. Appl. No. 16/949,671, Response filed Apr. 21, 2022 to Non Final Office Action dated Jan. 21, 2022".

"U.S. Appl. No. 16/949,671, Response filed Jul. 18, 2022 to Final Office Action dated May 18, 2022", 14 pgs.

Ganesh, J, et al., "Web Services and Multi-Channel Integration: A Proposed Framework", IEEE International Conference on Web Services, pp. 70-77, doi: 10.1109/ICWS.2004.1314725, (2004), 8 pgs.

Kyrillidis, Lazaros, et al., "Card-present Transactions on the Internet Using the Smart Card Web Server", 2013 12th IEEE International Conference on Trust, Security and Privacy in Computing and Communications, (2013), 9 pgs.

"U.S. Appl. No. 16/949,671, Notice of Allowance dated Feb. 1, 2023".

Arvaniti, C, "The Evolution of E-Business Environment in Fashion Sector", International Conference on Intelligent Systems, Modelling and Simulation, (2010), 443-449.

Gupta, Dushyant, et al., "Developing Customer-Seller Intimacy Relationship in E-Commerce Business using 3-E Framework", 61st International Scientific Conference on Information Technology of Riga Technical University, (2020), 6 pgs.

Safibullaevna, B, "Projecting Parametres Trade Electronic Platform", International Conference on Information Science and Communications Technologies, (2019), 10 pgs.

* cited by examiner

COUNTEROFFER FOR MARKET OFFER CODE FAILED VALIDATION

CROSS REFERENCE TO RELATED APPLICATION

This application is related to U.S. patent application Ser. No. 16/949,671, filed on Nov. 10, 2020, now issued as U.S. Pat. No. 11,631,101, which is hereby incorporated by reference herein in its entirety.

BACKGROUND

In current digital marketing systems, once an offer/coupon has been published, there are little or no controls on use of that offer/coupon. It is not unusual for offer recipients to share their offers with their friends, family, online connections, and social media connects. This often leads to viral proliferation of offers, and potential customers redeeming offers for products or services that are not best suited to them. There is a need for offer control and validation, to ensure that potential customers are receiving and redeeming offers that are unique and best suited to the needs of the potential customer.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

The present subject matter provides for a unique market offer code and validation to ensure that potential customers are receiving and redeeming offers that are unique and best suited to the needs of the potential customer. Embodiments include a multi-channel (email or in app, for example) solution that supports unique individualized offers for deposit products that can be presented across all marketing channels, digitally validated, tracked, and fulfilled. Specifically, marketing offers for deposit products are uniquely tied to a user or potential customer such that only the targeted user may redeem the offer. When a user attempts to redeem the offer, the validation process/component confirms the identity of the user to prevent viral proliferation of targeted offers (e.g., unauthorized offer sharing via social media, websites, etc.). If validation fails, decision logic of the present subject matter may present one or more counteroffers to the user that include a product or service that are better suited to the user's needs.

In current digital marketing systems, once an offer/coupon has been published, there are little or no controls on use of that offer/coupon. Unlike paper coupons or offers, digital offers/coupons can be easily shared by offer recipients with their friends, family, online connections, and social media connections by the click of a button. This often leads to viral proliferation of offers, and potential customers redeeming offers for products or services that are not best suited to them. The present subject matter provides a technical solution to this technical problem, by providing for offer control and validation, to ensure that potential customers are receiving and redeeming offers that are unique and best suited to the needs of the potential customer.

According to various embodiments, a targeted offer is digitally transmitted to a customer with a unique marketing offer code (potentially across multiple channels with the same offer code). The offer code may be presented with a specifically crafted uniform resource locator (URL) link that includes the product link and offer that drops the user into the product workflow, in some embodiments. A user attempts to redeem the offer, and may be validated automatically based on cookies, existing login, etc., or manually based on the user entering in information, in various embodiments. In some embodiments, the user is validated and presented with a decision (e.g., approval or denial) with evidence of the offer. In other embodiments, upon determining that the user is not approved for the marketing offer, providing, by the computer system, access to the user to an additional marketing offer tailored to the user. Thus, the present subject matter provides for offer control and validation intelligence that also improves efficiency of operation in acknowledging and fulfilling offers.

Marketing offers for products and services may be communicated over various marketing channels. Some of these channels may include targeted marketing paths (email or direct mail); third-party marketing paths; non-targeted personalized paths; nontargeted generic offers; and tiered offers. Provided herein is a multi-channel system and process that prevents proliferation of offers intended for a single individual customer or business customer. The present subject matter can be used with offers, such as marketing offers, for any type of product or service. Some embodiments of the present systems and methods are illustrated for use with marketing offers for opening new banking deposits accounts (e.g., checking accounts). However, the present subject matter can be applied to all product and service categories including financial institution deposits, credit, lending, etc. as well as non-financial institution products and services.

Figure 1A:
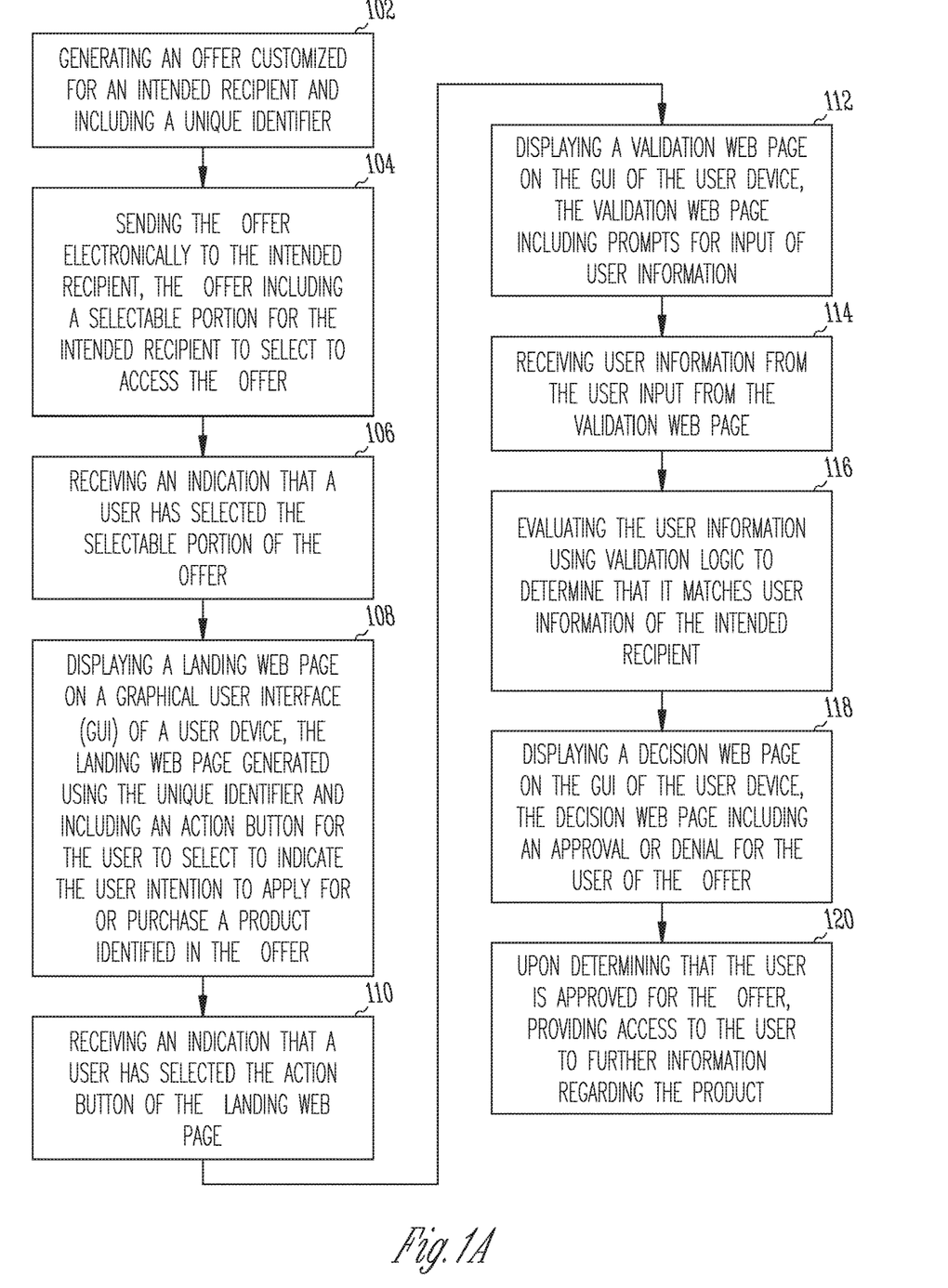
FIG. 1A illustrates an example embodiment of a method for unique market offer code and validation.
Figure 1B:
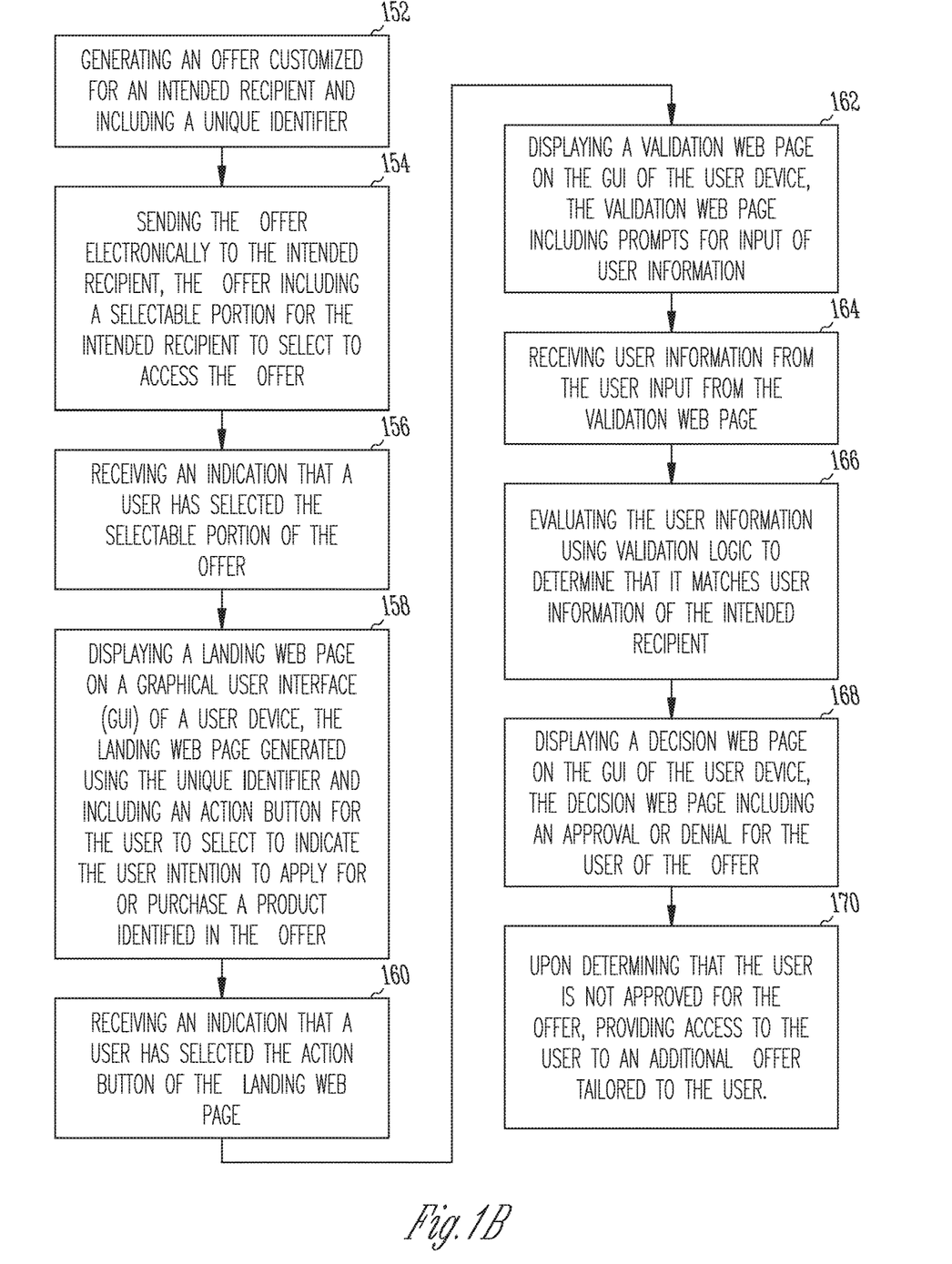
FIG. 1B illustrates an example embodiment of a method for providing a counteroffer for market offer code failed validation.
Figure 1C:
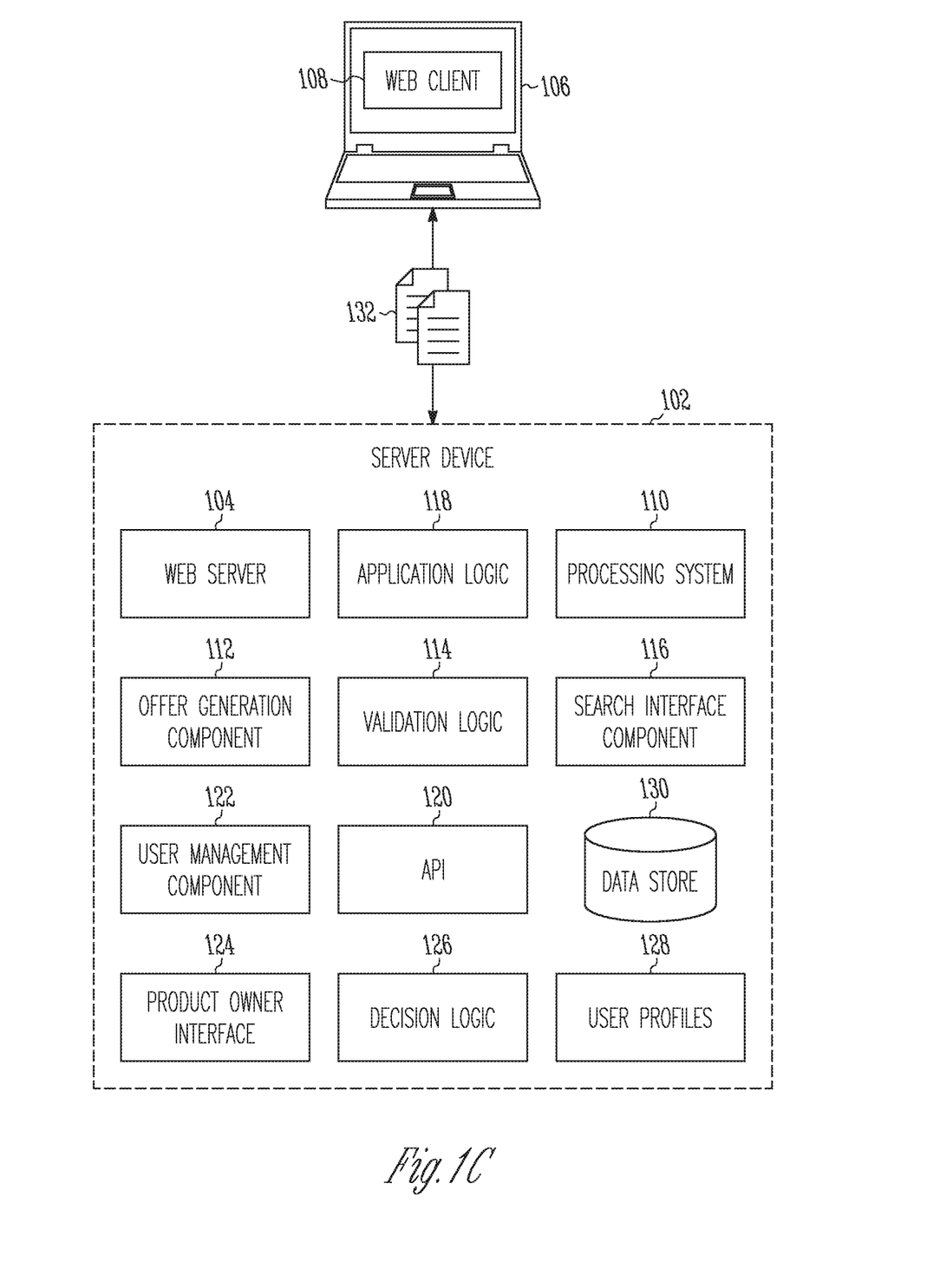
FIG. 1C illustrates an example embodiment of a computer system for use in the present subject matter.

FIG. 1C illustrates an example embodiment of a computer system for use in the present subject matter. FIG. 1 comprises a server device 102, web server 104, client device 106, web client 108, processing system 110, offer generation component 112, validation logic 114, search interface component 116, application logic 118, application programming interface (API) 120, user management component 122, product owner interface 124, decision logic 126, user profiles 128, data store 130, and data 132.

Client device 106 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device. Client device 106 may be associated with one or more entities that interact with server device 102. An entity may be an individual, group of individuals, or company in various examples.

Client device 106 and Server device 102 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

Client device 106 and server device 102 may communicate data 132 over the network. Data 132 may be, but is not limited to, search requests, search results, market offers (as discussed in more detail below), user information, validation results, and decision results.

In some examples, the communication may occur using an application programming interface (API) such as API 120. An API provides a method for computing processes to exchange data. A web-based API (e.g., API 120) may permit communications between two or more computing devices such as a client and a server.

Server device 102 is illustrated as set of separate elements (e.g., component, logic, etc.). However, the functionality of individual elements may be performed by a single element. An element may represent computer program code that is executable by processing system 110. The program code may be stored on a storage device (e.g., data store 130) and loaded into a memory of the processing system 110 for execution. Portions of the program code may be executed in a parallel across multiple processing units (e.g., a core of a general-purpose computer processor, a graphical processing unit, an application specific integrated circuit, etc.) of processing system 110. Execution of the code may be performed on a single device or distributed across multiple devices. In some example, the program code may be executed on a cloud platform (e.g., MICROSOFT AZURE® and AMAZON EC2®) using shared computing infrastructure.

Server device 102 may include web server 104 to enable data exchanges with client device 106 via web client 108. Although generally discussed in the context of delivering webpages via the Hypertext Transfer Protocol (HTTP), other network protocols may be utilized by web server 104 (e.g., File Transfer Protocol, Telnet, Secure Shell, etc.). A user may enter in a uniform resource identifier (URI) into web client 108 (e.g., the INTERNET EXPLORER® web browser by Microsoft Corporation or SAFARI® web browser by Apple Inc.) that corresponds to the logical location (e.g., an Internet Protocol address) of web server 104. In response, web server 104 may transmit a web page that is rendered on a display device of a client device (e.g., a mobile phone, desktop computer, etc.).

Additionally, web server 104 may enable a user to interact with one or more web applications provided in a transmitted web page. A web application may provide user interface (UI) components that are rendered on a display device of client device 106. The user may interact (e.g., select, move, enter text into) with the UI components, and based on the interaction, the web application may update one or more portions of the web page. A web application may be executed in whole, or in part, locally on client device 106. The web application may populate the UI components with data from external sources or internal sources (e.g., data store 130) in various examples.

For example, server device 102 may provide a web application (e.g., offer generation component 116) to a user to provide an offer for a product or service to the user. Data store 130 may store user information and/or product/offer information, including unique identifiers to identify offers for desired recipients.

The web application may be executed according to application logic 118. Application logic 118 may use the various elements of server device 102 to implement the web application. For example, application logic 118 may issue API calls to retrieve or store data from data store 130 and transmit it for display on client device 106. Similarly, data entered by a user into a UI component may be transmitted using API 120 back to the web server 104.

Data store 130 is depicted as singular element but may in actuality be multiple data stores. The specific storage layout and model used in by data store 130 may take a number of forms-indeed, a data store 130 may utilize multiple models. Data store 130 may be, but is not limited to, a relational database (e.g., SQL), non-relational database (NoSQL) a flat file database, object model, document details model, graph database, shared ledger (e.g., blockchain), or a file system hierarchy. Data store 130 may store data on one or more storage devices (e.g., a hard disk, random access memory (RAM), etc.). The storage devices may be in standalone arrays, part of one or more servers, and may be located in one or more geographic areas.

User profiles 128 may store the profiles of users that interact with server device 102. A user profile may include a user identifier (e.g., a username) and a password. A user profile may also include a user's name, address, phone number, account numbers, unique identifiers, and other information.

In one embodiment, a unique offer is generated by offer generation logic 112 and provided to a customer by server device 102 that is associated with a unique offer code. This unique offer may be sent via email, for example, and may be stored in data store 130. As discussed herein, 'unique' refers to an offer that is customized specifically for the intended recipient. To this end, even if another customer received an offer with the same discount, etc., as another user, both offers are unique because of the unique offer code. The offer, such as a digital email offer, includes a 'Get My Offer' button as a mode of redemption, which the recipient may click to learn more about the offer. Selection of the button transitions the customer to a detailed landing web page. The landing page includes information (e.g., terms and conditions) descriptive of the product or service relating to the offer. The customer may then select an action button, such as a 'Apply Now' button on the web page, to apply-for or purchase the offered product or service.

Responsive to selection of the action button, the customer is transitioned to a validation page in an embodiment. The validation page includes a format for input of user information that will be used to validate that the offer is being redeemed by the correct or targeted user, in various embodiments. In various embodiments, validation logic 114 operates on inputs provided by the user at the validation page to validate the authenticity of the offer and the identity of the user. User provided inputs may include name, address, email, and other user information. In some instances, this information may be automatically ascertained, for instance, based on cookies, URL, account information, etc. If the information is automatically ascertained, it may appear prefilled in one or more entry fields on the validation page. The user may also be asked if she or he is a current customer of the seller. If the answer to this question is yes, the customer may be prompted to log in to a corresponding user account with the seller. The offer may be tied to this account, in some embodiments.

Once the input is submitted, the user may receive a confirmation of the submission (e.g., via email), in various embodiments. The user may then receive a decision from decision logic 126 with evidence of the offer, which also may include an approval or a denial. If approved, the user may access the product or service, by for example logging in to a new checking account. Communications may also be provided to the user on offer fulfilment status, reminding the user what it takes to qualify for the offer, the status of the user with respect to the offer requirements, and an incentive delivery status. The present subject matter may further provide internal tools, such as a banker look-up tool or product owner interface 124, which may enable employees of the seller to review available offers and fulfillment statuses.

In various examples, regardless of the specific marketing channel, all offers go through the same validation process therefore ensuring that a unique offer is being redeemed by the intended recipient. If validation fails, the user is not approved for the related product/service.

If the validation logic 114 determines that the user does not qualify for the unique offer, decision logic 126 may provide one or more counteroffers to the user. For example, the user may fail validation due to incorrect zip code, offer expiration, product not available to customer, etc. Counteroffers may be customized for the user, in various embodiments. In some examples, the counteroffer is generated in the same manner as the original offer using offer generation component 112, including using a unique code for the targeted user or users. The counteroffer may include offer details and may direct the customer to select a digital button to learn more about the counteroffer. The user may then be transitioned to a landing page at which the user can apply for the product or service related to the counteroffer. At this point, the user is placed back in the application process, in which the user may submit their application for approval/denial. Once the input is submitted, the user may receive a confirmation of the submission (e.g., via email). The user may then receive a decision from decision logic 126 with evidence of the offer, which may include an approval or a denial. If approved, the customer may access the product or service, in various embodiments.

Thus, the present subject matter addresses the problem of validation failures. There are numerous ways a user may fail the validation process. In fact, it may be the result of a deficiency in the offer itself (e.g., a unique offer marketed to the wrong user). This disclosure provides a solution that recovers from a failed validation to provide a user with an offer that is best suited to the user.

In certain examples, offers may be tiered. Tiered offers may include more than one condition/incentive and may be tied to more than one product or service. For instance, a tiered offer—"Get $100 when you open a savings account, and get $150 when you open a checking account. Get $300 if you do both!" The described processes and systems may also be applied to offers that require redemption through multiple tiers.

FIG. 1A illustrates an example embodiment of a method for unique market offer code and validation. A method includes generating a marketing offer customized for an intended recipient at step 102, and at step 104 sending the marketing offer electronically to the intended recipient, the marketing offer including a selectable portion for the intended recipient to select to access the marketing offer. The method further includes at step 106 receiving an indication that a user has selected the selectable portion of the marketing offer, and at step 108 displaying a landing web page on a graphical user interface (GUI) of a user device, the landing web page including information about the marketing offer and an action button for the user to select to indicate the user intention to apply for or purchase a product identified in the marketing offer. At step 110, an indication that a user has selected the action button of the marketing landing web page is received, and a validation web page is displayed on the GUI of the user device at step 112, the validation web page including prompts for input of user information. The user information is received from the user input from the validation web page at step 114 and evaluated using validation logic to determine authenticity of the marketing offer and to confirm identity of the user as the intended recipient at step 116. A decision web page is displayed on the GUI of the user device at step 118, the decision web page including an approval or denial for the user of the marketing offer. Upon determining that the user is approved for the marketing offer, access is provided at step 120 to the user to further information regarding the product.

According to various embodiments, the selectable portion includes a button on the GUI of the user device of the user that can be selected by the user by clicking on the button. The action button includes a second selectable portion of the GUI of the user device that can be selected by the user by clicking on the action button, in various embodiments. The information about the marketing offer includes terms and conditions of the marketing offer, among other things in some embodiments. The user information may include one or more of a name, address, email or other demographic information of the user. In some embodiments, the computer system is configured to automatically ascertain a portion of the user information based on at least one of cookies, user account information or a uniform resource locator (URL). This portion of the user information is used by the computer system to prefill one or more entry fields on the validation page, in some embodiments. In various embodiments, the validation page includes an inquiry portion configured to determine if the user is a customer of a seller, such as a financial institution, associated with the marketing offer. In some embodiments, upon determining that the user is the customer of the seller, the user is prompted on the GUI of the user device to log in to a corresponding user account with the seller. The method further includes sending an email to the user providing confirmation of submission of the user information, in an embodiment. The method further includes sending an email to the user providing notification of the approval or denial for the user of the marketing offer, in various embodiments.

FIG. 1B illustrates an example embodiment of a method for providing a counteroffer for market offer code failed validation. A method includes generating a marketing offer customized for an intended recipient at step 152, and at step 154 sending the marketing offer electronically to the intended recipient, the marketing offer including a selectable portion for the intended recipient to select to access the marketing offer. The method further includes at step 156 receiving an indication that a user has selected the selectable portion of the marketing offer, and at step 158 displaying a landing web page on a graphical user interface (GUI) of a user device, the landing web page including information about the marketing offer and an action button for the user to select to indicate the user intention to apply for or purchase a product identified in the marketing offer. At step 160, an indication that a user has selected the action button of the marketing landing web page is received, and a validation web page is displayed on the GUI of the user device at step 162, the validation web page including prompts for input of user information. The user information is received from the user input from the validation web page at step 164 and evaluated using validation logic to determine authenticity of the marketing offer and to confirm identity of the user as the intended recipient at step 166. A decision web page is displayed on the GUI of the user device at step 168, the decision web page including an approval or denial for the user of the marketing offer. Upon determining that the user is not approved for the marketing offer, access is provided at step 170 to the user to an additional marketing offer tailored to the user.

Various embodiments of the present subject matter include a computing system comprising one or more processors and a data storage system in communication with the one or more processors, where the data storage system comprises instructions thereon that, when executed by the one or more processors, causes the one or more processors to generate a marketing offer customized for an intended recipient, and send the marketing offer electronically to the intended recipient, the marketing offer including a selectable portion for the intended recipient to select to access the marketing offer. An indication is received that a user has selected the selectable portion of the marketing offer, and a landing web page is displayed on a graphical user interface (GUI) of a user device, the landing web page including information about the marketing offer and an action button for the user to select to indicate the user intention to apply for or purchase a product identified in the marketing offer. An indication is received that the user has selected the action button of the marketing landing web page, and a validation web page is displayed on the GUI of the user device, the validation web page including prompts for input of user information. User information is received from the user input from the validation web page, and the user information is evaluated using validation logic to determine authenticity of the marketing offer and to confirm identity of the user as the intended recipient. A decision web page is displayed on the GUI of the user device, the decision web page including an approval or denial for the user of the marketing offer. Upon determining that the user is approved for the marketing offer, access is provided to the user to further information regarding the product, in one embodiment. In another embodiment, upon determining that the user is not approved for the marketing offer, access is provided to the user to an additional marketing offer tailored to the user.

In various embodiments, providing access to the user further includes providing on the GUI of the user device a prompt to login to access a financial product associated with the marketing offer. The marketing offer is related to a plurality of products or services, in various embodiments. In some embodiments, the marketing offer is a tiered marketing offer providing incentive for the user to apply for the plurality of products or services. The user device includes one or more of a laptop computer, a personal computer, a tablet, or a smart phone, in various embodiments. Other user devices may be accommodated without departing from the scope of the present subject matter.

Various embodiments of the present subject matter include a non-transitory computer-readable storage medium, the non-transitory computer-readable storage medium including instructions that, when executed by computers, cause the computers to perform operations including generating a marketing offer customized for an intended recipient, and sending the marketing offer electronically to the intended recipient, the marketing offer including a selectable portion for the intended recipient to select to access the marketing offer. An indication is received that a user has selected the selectable portion of the marketing offer, and a landing web page is displayed on a graphical user interface (GUI) of a user device, the landing web page including information about the marketing offer and an action button for the user to select to indicate the user intention to apply for or purchase a product identified in the marketing offer. An indication is received that the user has selected the action button of the marketing landing web page, and a validation web page is displayed on the GUI of the user device, the validation web page including prompts for input of user information. User information is received from the user input from the validation web page, and the user information is evaluated using validation logic to determine authenticity of the marketing offer and to confirm identity of the user as the intended recipient. A decision web page is displayed on the GUI of the user device, the decision web page including an approval or denial for the user of the marketing offer. Upon determining that the user is approved for the marketing offer, access is provided to the user to further information regarding the product, in one embodiment. In another embodiment, upon determining that the user is not approved for the marketing offer, access is provided to the user to an additional marketing offer tailored to the user.

In various embodiments, the validation page includes an inquiry portion configured to determine if the user is a customer of a seller associated with the marketing offer. Upon determining that the user is the customer of the seller the user is prompted on the GUI of the user device to log in to a corresponding user account with the seller, in some embodiments. As used herein, the seller may be any person or entity marketing an offer of any product or service, whether for sale, lease, sign-up or other type of offer. The user information includes a zip code of a residence of the user, among other information, in various embodiments.

Figure 2:
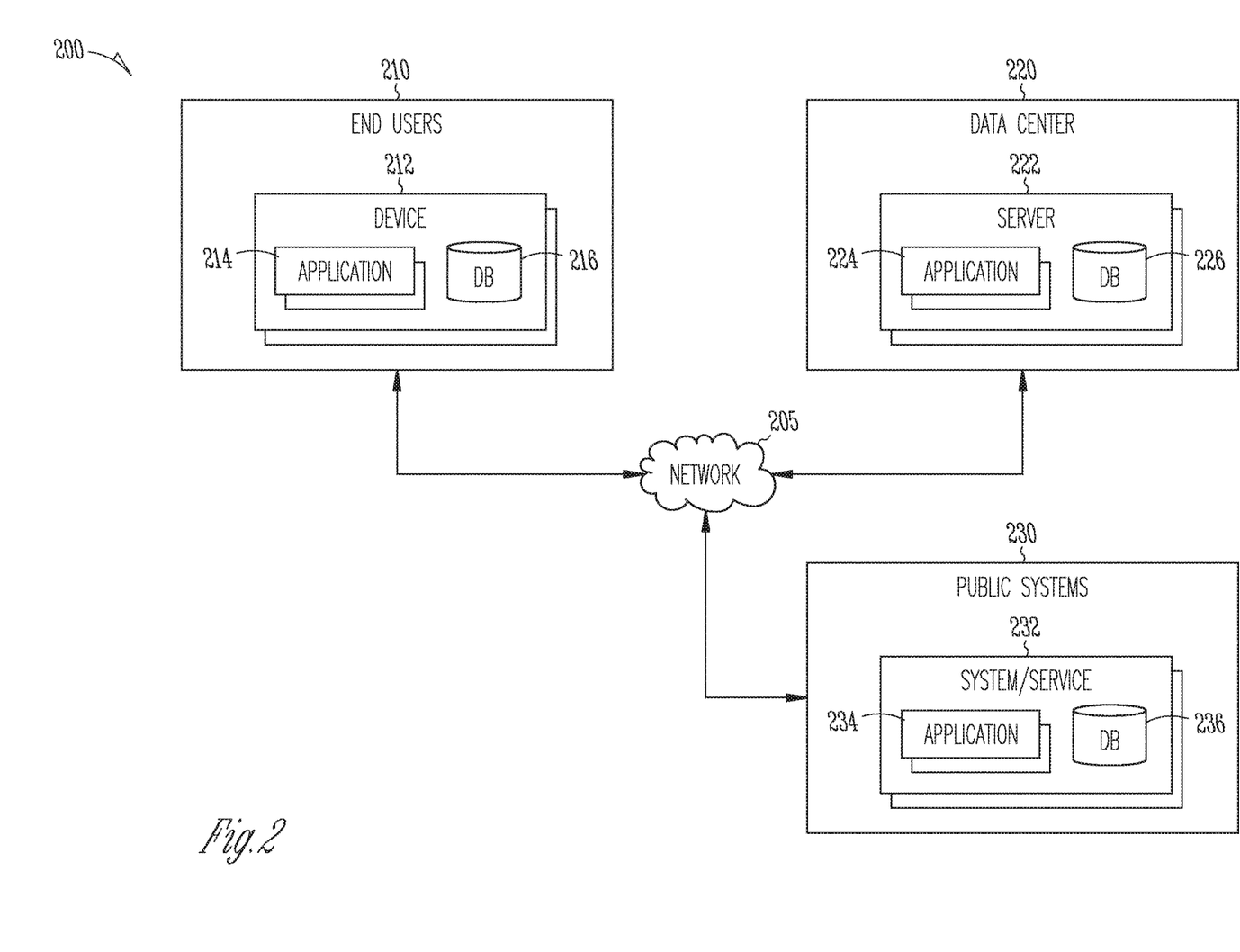
FIG. 2 illustrates an exemplary infrastructure for use in the present subject matter.

FIG. 2 illustrates an exemplary infrastructure for providing the system of the present subject matter. The infrastructure may comprise a distributed system 200 that may include a client-server architecture or cloud computing system. Distributed system 200 may have one or more end users 210. An end user 210 may have various computing devices 212, which may be a machine 500 as described below. The end-user computing devices 212 may comprise applications 214 that are either designed to execute in a stand-alone manner, or interact with other applications 214 located on the device 212 or accessible via the network 205. These devices 212 may also comprise a data store 216 that holds data locally, the data being potentially accessible by the local applications 214 or by remote applications.

The system 200 may also include one or more data centers 220. A data center 220 may be a server 222 or the like associated with a business entity that an end user 210 may interact with. The business entity may be a computer service provider, as may be the case for a cloud services provider, or it may be a consumer product or service provider, such as a retailer. The data center 220 may comprise one or more applications 224 and databases 226 that are designed to interface with the applications 214 and databases 216 of end-user devices 212. Data centers 220 may represent facilities in different geographic locations where the servers 222 may be located. Each of the servers 222 may be in the form of a machine(s) 500.

The system 200 may also include publicly available systems 230 that comprise various systems or services 232, including applications 234 and their respective databases 236. Such applications 234 may include news and other information feeds, search engines, social media applications, and the like. The systems or services 232 may be provided as comprising a machine(s) 500.

The end-user devices 212, data center servers 222, and public systems or services 232 may be configured to connect with each other via the network 205, and access to the network by machines may be made via a common connection point or different connection points, e.g. a wireless connection point and a wired connection. Any combination of common or different connections points may be present, and any combination of wired and wireless connection points may be present as well. The network 205, end users 210, data centers 220, and public systems 230 may include network hardware such as routers, switches, load balancers and/or other network devices.

Other implementations of the system 200 are also possible. For example, devices other than the client devices 212 and servers 222 shown may be included in the system 200. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 222.

Figure 3:
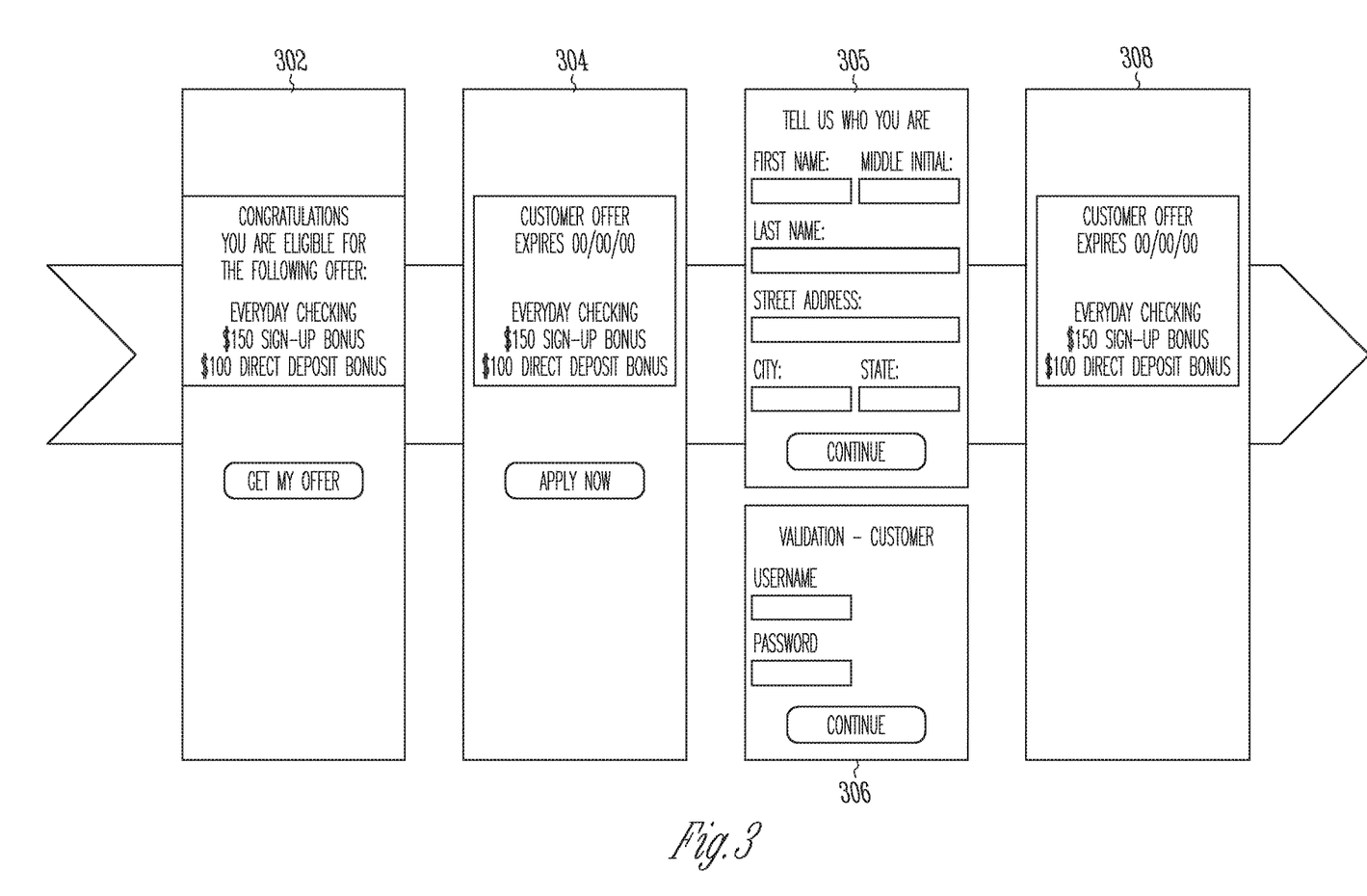
FIG. 3 is a graphical diagram illustrating user interface displays for market offer code validation, according to various embodiments.

FIG. 3 is a graphical diagram illustrating user interface displays for market offer code validation, according to various embodiments. A first display screen 302 provided on a user device includes a targeted marketing email to a user including a marketing offer, in an embodiment. In some embodiments, the marketing offer is provided to the user using direct mail. A second display screen 304 provided on a user device illustrates an offer details landing page provide to the user after the user selects the "get my offer" button on the first display 302. A third display screen 305, 306 shows validation pages provided to prospective customers 305 or existing customers 306. A fourth display screen 309 shows a prefilled display of e customer information, in various embodiments.

Figure 4A:
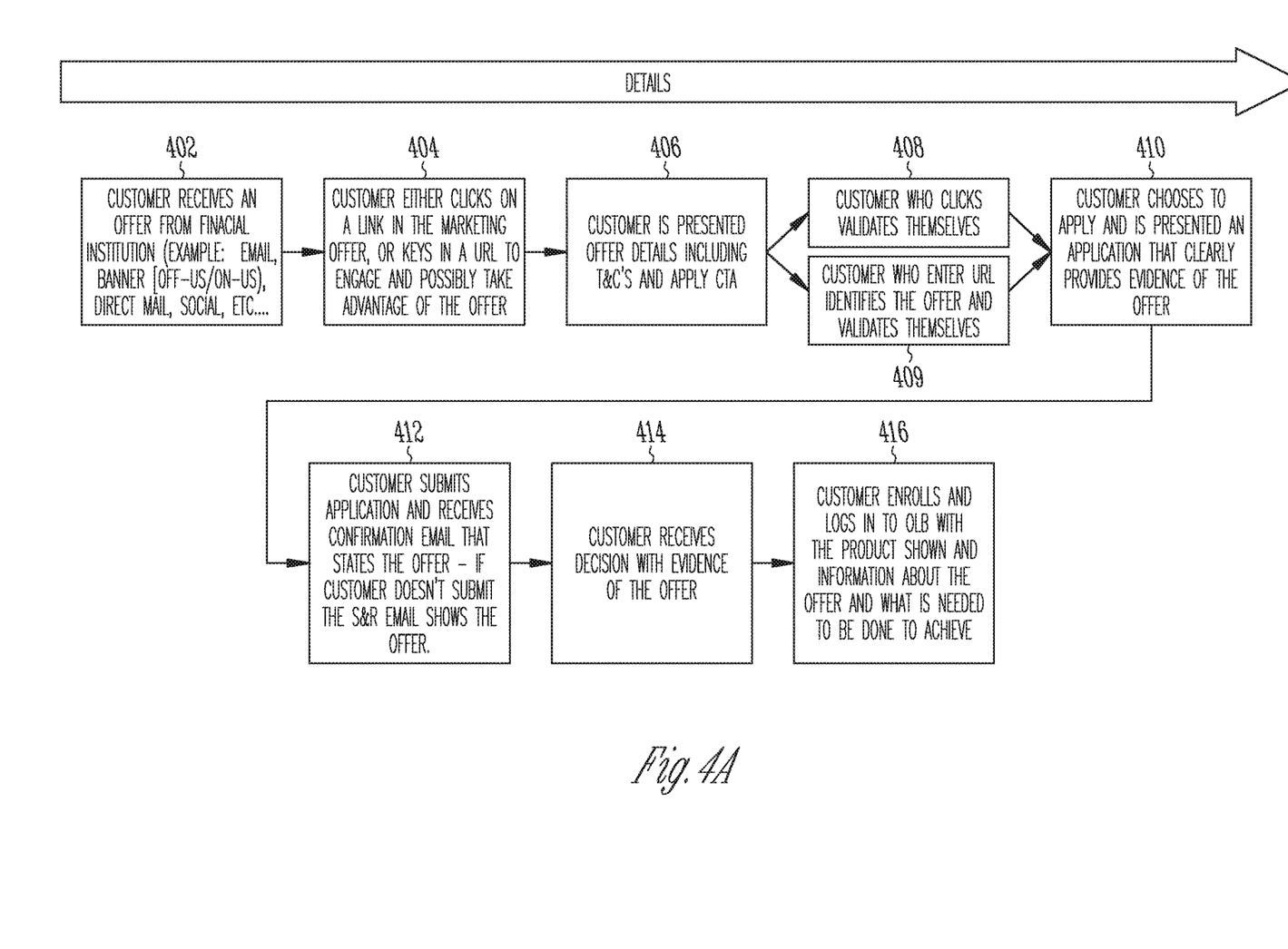
FIGS. 4A-4D are flowcharts illustrating process steps for market offer and counteroffer validation, according to various embodiments.

FIGS. 4A-4D are flowcharts illustrating process steps for market offer and counteroffer validation, according to various embodiments. FIG. 4A illustrates process steps for market offer validation, according to an embodiment. At step 402, a user receives a targeted offer from a seller, such as a financial institution. The seller may be any entity marketing an offer of any product or service, whether for sale, lease, sign-up or other type of offer. At step 404, the user either clicks on a link in the marketing offer or keys in a UJRL to review the offer. The user is presented with offer details including terms and conditions of the offer, at step 406. At steps 408 and 409, the user is validated for the offer. The user chooses to apply and is presented an application including evidence of the offer, at step 410. At step 412, the user submits an application and receives a confirmation email that confirms receipt of the application. At step 414, the user receives a decision with evidence of the offer, and at step 416, the user enrolls and logs into the present system to obtain further information about the offer, in various embodiments.

Figure 4B:
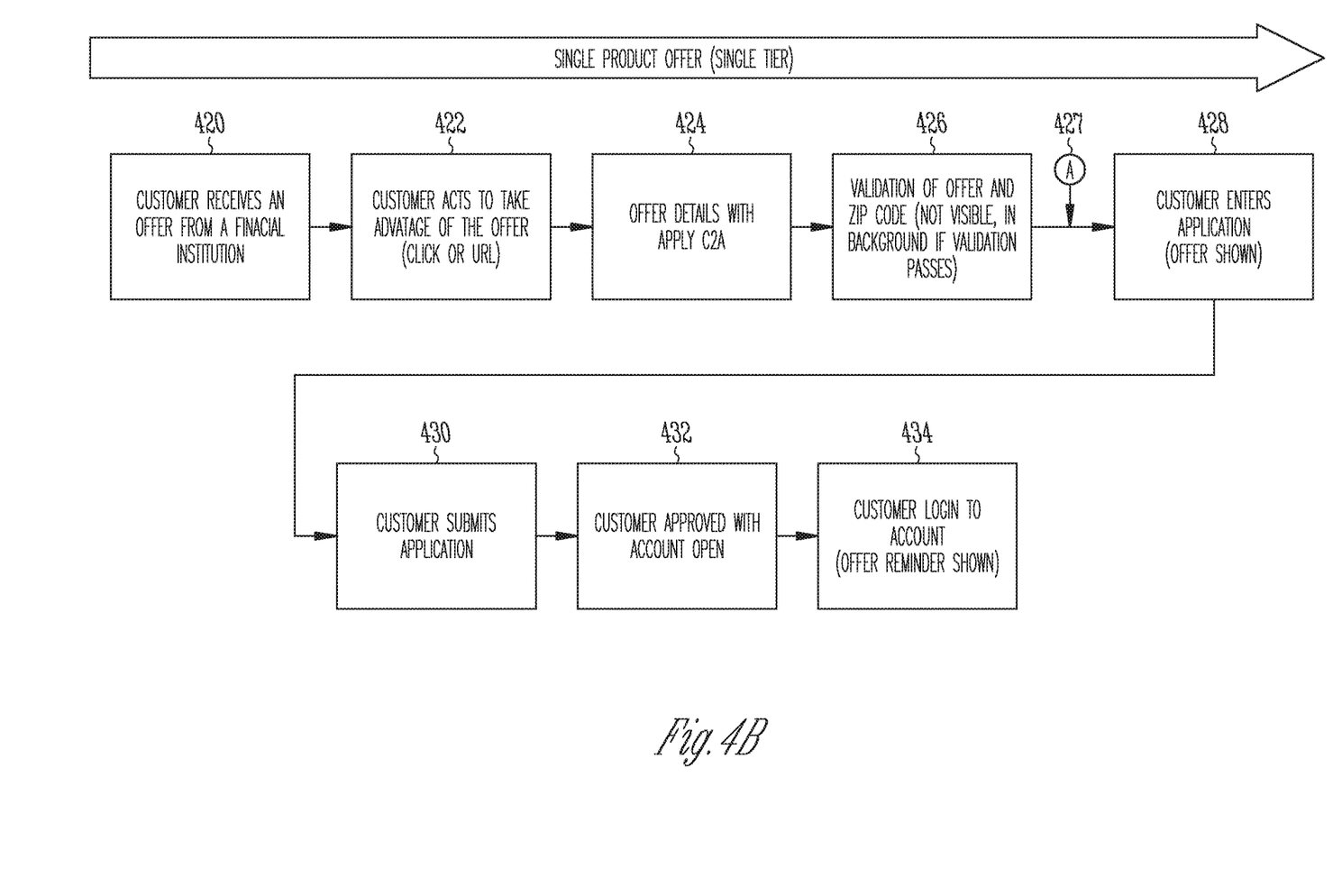

FIG. 4B illustrates process steps for market offer validation for a single product offer, according to an embodiment. At step 420, a user receives a targeted offer from a seller. At step 422, the user acts to take advantage of the offer, by either clicking on a link in the marketing offer or keying in a URL to review the offer. The user is presented with offer details including terms and conditions of the offer, at step 424. At step 426, the user is validated for the offer, including using a background process to compare user information including zip code to qualifying requirements. If the user passes validation at step 427, the user is provided the application at step 428 and submits the completed application at step 430. If the application is approved at step 432, the user is provided a log in to an account at step 434.

Figure 4C:
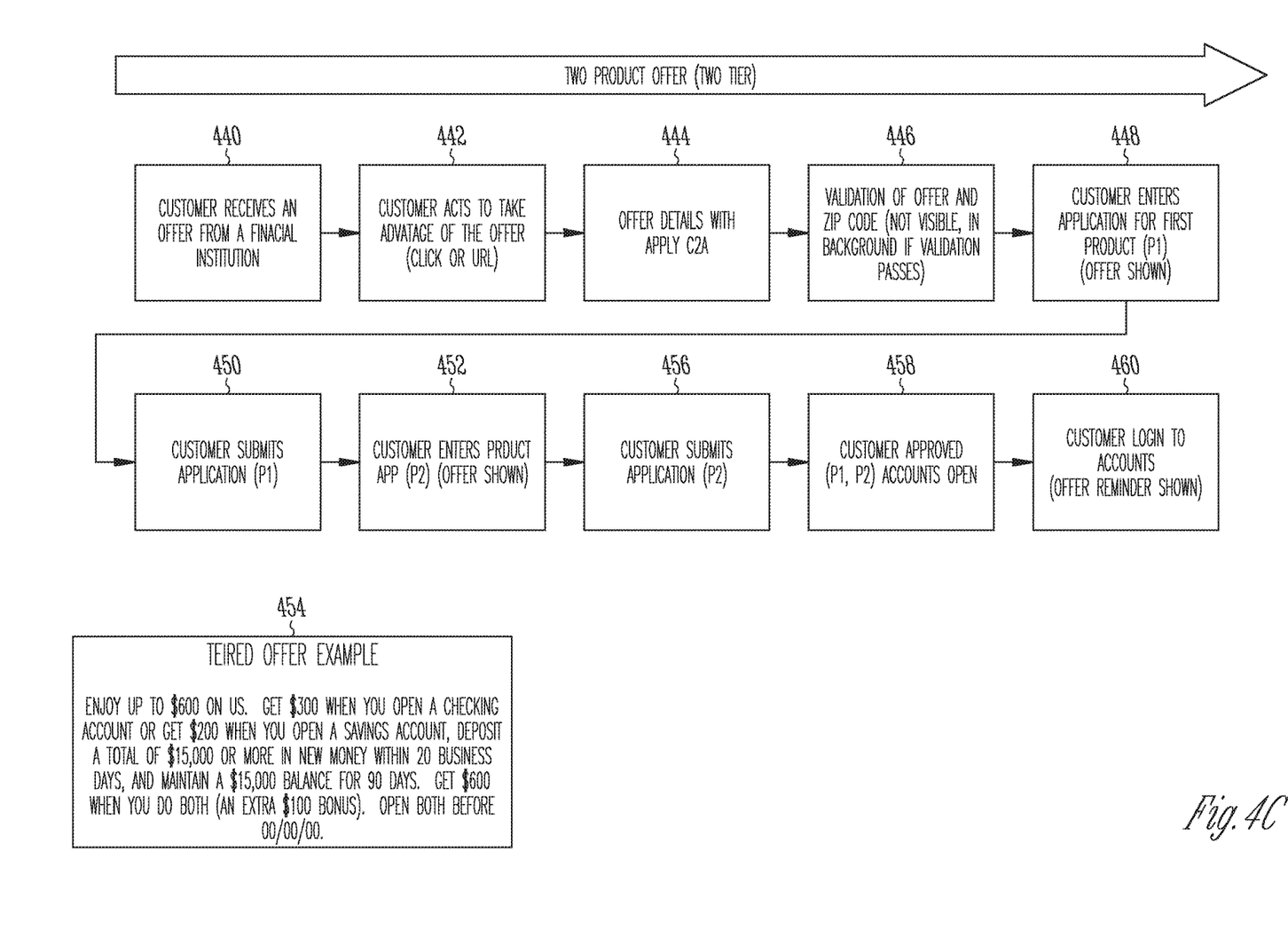

FIG. 4C illustrates process steps for market offer validation for a multiple product (or tiered) offer, according to an embodiment. An example of a tiered offer is provided at 454. At step 440, a user receives a targeted offer from a seller. At step 442, the user acts to take advantage of the offer, by either clicking on a link in the marketing offer or keying in a URL to review the offer. The user is presented with offer details including terms and conditions of the offer, at step 444. At step 446, the user is validated for the offer, including using a background process to compare user information including zip code to qualifying requirements. If the user passes validation, the user is provided the application for the first product of the tiered offer at step 448 and submits the completed application at step 450. The user is then provided the application for the second at step 452 and submits the completed application at step 456. If the application is approved at step 458, the user is provided a log in to the accounts for each product at step 460.

Figure 4D:
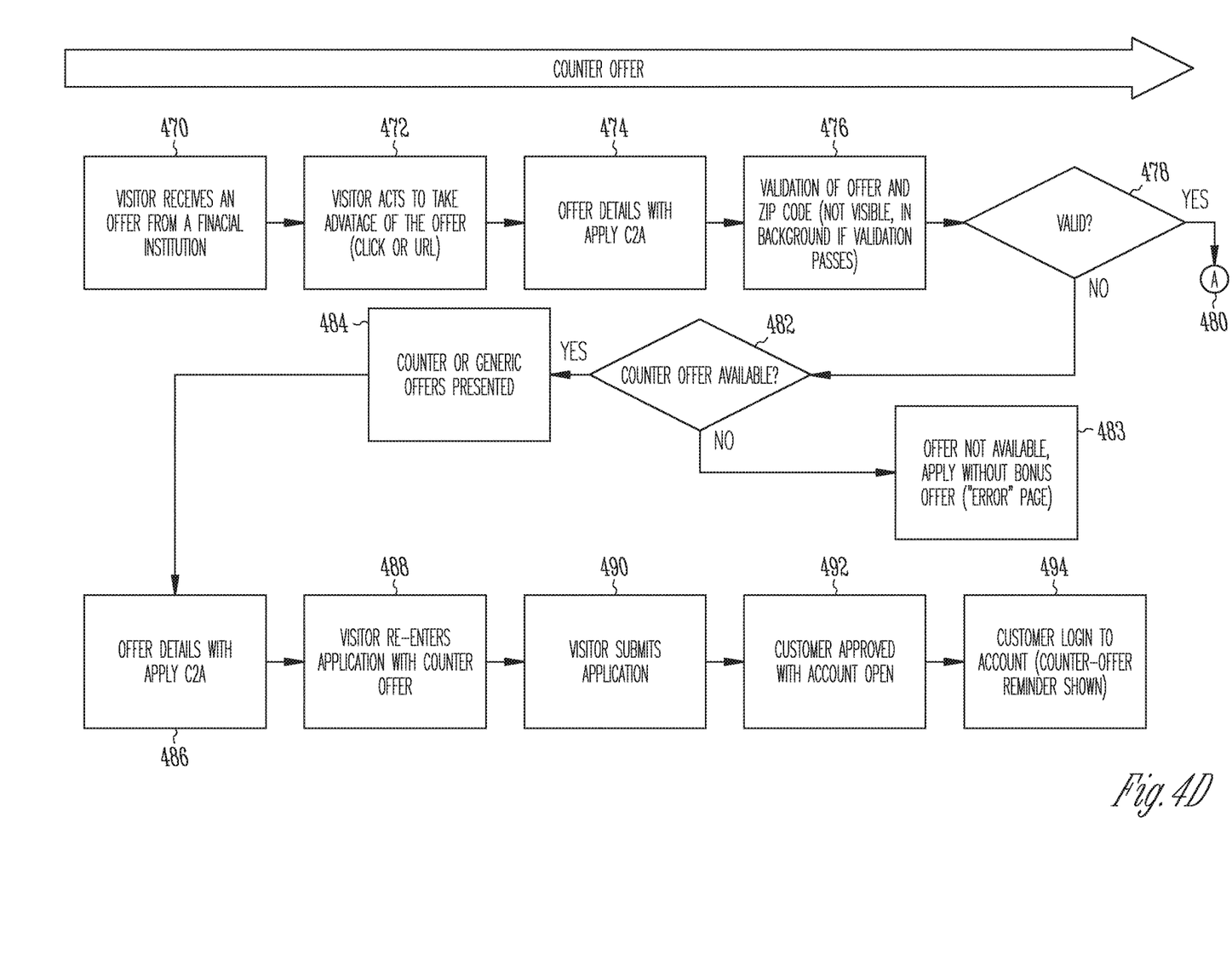

FIG. 4O illustrates process steps for market offer and counteroffer validation, according to an embodiment. At step 470, a user receives a targeted offer from a seller. At step 472, the user acts to take advantage of the offer, by either clicking on a link in the marketing offer or keying in a URL to review the offer. The user is presented with offer details including terms and conditions of the offer, at step 474. At step 476, the user is validated for the offer, including using a background process to compare user information including zip code to qualifying requirements. If the user passes validation, the user is provided the application at step 480, using the process as shown in FIG. 4B, for example. If the user does not pass validation, the user is not the target for the initial offer. At step 482, the present subject matter determines if there is a counteroffer available for this non-targeted user. If there is no counteroffer available, the user may receive an error page and will only be able to apply for the product without a bonus or special offer at 483. If there is a counteroffer available, it is presented to the user at step 484 including offer details to apply for the counteroffer at step 486. At step 488, the user re-enters application data for the counteroffer and submits the application at step 490. If the application is approved at step 492, the user is provided a log in to the accounts for each product at step 494.

Figure 5:
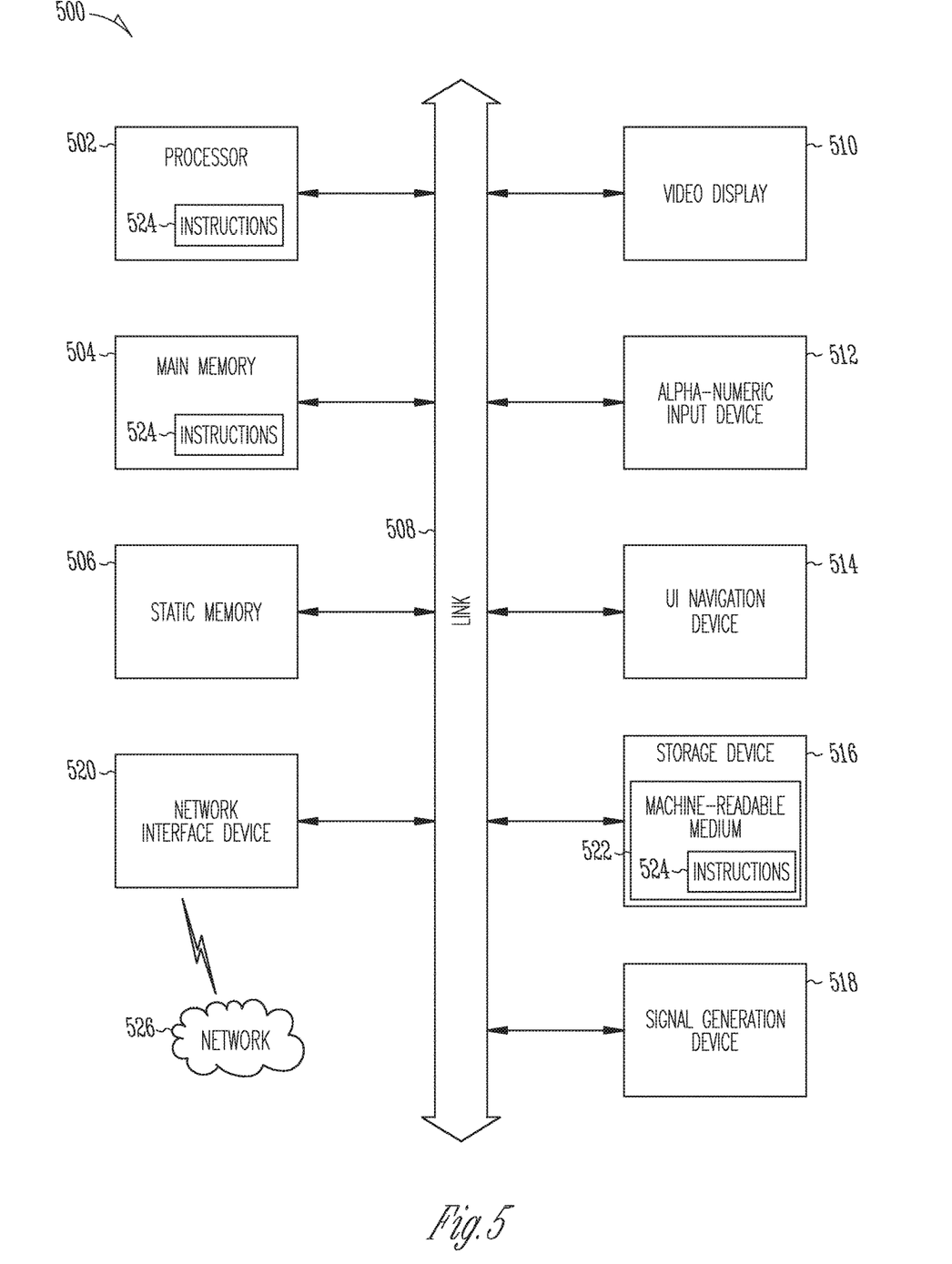
FIG. 5 is a block diagram of a machine in the example form of a computer system within which a set of instructions may be executed, for causing the machine to perform any one or more of the methodologies discussed herein.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile or cellular telephone such as a smart phone, a wearable device such as a smart watch, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The data storage device 516 includes a machine-readable medium 522 on which is stored one or more sets of data structures and instructions 524 (e.g., software) embodying or utilized by any one or more of the methodologies or functions described herein. The instructions 524 may include a machine learning system or algorithm, and may also reside, completely or at least partially, within the main memory 504, static memory 506, and/or within the processor 502 during execution thereof by the computer system 500, with the main memory 504, static memory 506, and the processor 502 also constituting machine-readable media.

While the non-transitory computer-readable storage medium 522 is illustrated in an example embodiment to be a single medium, the term "machine-readable medium" or "computer-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions (e.g., instructions 524) for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone system (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer-implemented method comprising:
   generating, by a computer system, an offer customized for an intended recipient and including a unique identifier for the intended recipient;
   sending, by the computer system, the offer electronically to the intended recipient, the offer including a selectable portion for the intended recipient to select to access the offer;
   receiving, by the computer system, an indication that a user has selected the selectable portion of the offer;
   displaying, by the computer system, a landing web page on a graphical user interface (GUI) of a user device, the landing web page generated using the unique identifier and including information about the offer and an action button for the user to select to indicate user intention to apply for or purchase a product identified in the offer;
   receiving, by the computer system, an indication that the user has selected the action button of the landing web page;
   displaying, by the computer system, a validation web page on the GUI of the user device, the validation web page including prompts for input of user information;
   receiving, by the computer system, the user information from the user input from the validation web page;
   evaluating, by the computer system, the user information using validation logic to determine whether the user is the intended recipient of the offer based on whether the user information matches user information of the intended recipient;

determining, by the computer system using the validation logic, that the offer is valid or invalid based on a geographic location of the user, an expiration date of the offer, and availability of the product;

displaying, by the computer system, a decision web page on the GUI of the user device, the decision web page including an approval or denial for the user of the offer based on the evaluation and the determination; and upon determining that the user is not the intended recipient of the offer or that the offer is invalid, automatically providing, by the computer system, access to the user to an additional offer tailored to the user.

2. The computer-implemented method of claim 1, wherein the offer is presented with a uniform resource locator (URL) link that includes a product link with the offer.

3. The computer-implemented method of claim 1, wherein the action button includes a second selectable portion of the GUI of the user device that can be selected by the user by clicking on the action button.

4. The computer-implemented method of claim 1, wherein the information about the offer includes terms and conditions of the offer.

5. The computer-implemented method of claim 1, wherein the user information includes one or more of a name, address, or email of the user.

6. The computer-implemented method of claim 1, wherein the computer system is configured to automatically ascertain a portion of the user information based on at least one of cookies, user account information or a URL.

7. The computer-implemented method of claim 6, wherein the portion of the user information is used by the computer system to prefill one or more entry fields on the validation page.

8. The computer-implemented method of claim 1, wherein the validation page includes an inquiry portion configured to determine if the user is a customer of a seller associated with the offer.

9. The computer-implemented method of claim 8, wherein upon determining that the user is the customer of the seller, prompting the user on the GLU of the user device to log in to a corresponding user account with the seller.

10. The computer-implemented method of claim 1, further comprising:
sending, by the computer system, an email to the user providing confirmation of submission of the user information.

11. The computer-implemented method of claim 1, further comprising:
sending, by the computer system, an email to the user providing notification of the approval or denial for the user of the offer.

12. A system comprising:
a computing system comprising one or more processors and a data storage system in communication with the one or more processors, wherein the data storage system comprises instructions thereon that, when executed by the one or more processors, causes the one or more processors to:
generate an offer customized for an intended recipient and including a unique identifier for the intended recipient;
send the offer electronically to the intended recipient, the offer including a selectable portion for the intended recipient to select to access the offer;
receive an indication that a user has selected the selectable portion of the offer;
display a landing web page on a graphical user interface (GUI) of a user device, the landing web page generated using the unique identifier and including information about the offer and an action button for the user to select to indicate user intention to apply for or purchase a product identified in the offer;
receive an indication that the user has selected the action button of the landing web page;
display a validation web page on the GUI of the user device, the validation web page including prompts for input of user information;
receive user information from the user input from the validation web page;
evaluate the user information using validation logic to determine whether the user is the intended recipient of the offer based on whether the user information matches user information of the intended recipient;
determine, using the validation logic, that the offer is valid or invalid based on a geographic location of the user, an expiration date of the offer, and availability of the product;
display a decision web page on the GUI of the user device, the decision web page including an approval or denial for the user of the offer based on the evaluation and the determination; and
upon determining that the user is not the intended recipient of the offer or that the offer is invalid, automatically provide access to the user to an additional offer tailored to the user.

13. The system of claim 12, wherein providing access to the user further includes providing on the GUI of the user device a prompt to login to access a financial product associated with the offer.

14. The system of claim 12, wherein the offer is related to a plurality of products or services.

15. The system of claim 14, wherein the offer is a tiered offer providing incentive for the user to apply for the plurality of products or services.

16. The system of claim 12, wherein the user device includes one or more of a laptop computer, a personal computer, a tablet, or a smart phone.

17. A non-transitory computer-readable storage medium, the non-transitory computer-read able storage medium including instructions that, when executed by computers, cause the computers to perform operations of:
generating an offer customized for an intended recipient and including a unique identifier for the intended recipient;
sending the offer electronically to the intended recipient, the offer including a selectable portion for the intended recipient to select to access the offer;
receiving an indication that a user has selected the selectable portion of the offer;
displaying a landing web page on a graphical user interface (GUI) of a user device, the landing web page generated using the unique identifier and including information about the offer and an action button for the user to select to indicate user intention to apply for or purchase a product identified in the offer;
receiving an indication that the user has selected the action button of the landing web page;
displaying a validation web page on the GUI of the user device, the validation web page including prompts for input of user information;

receiving user information from the user input from the validation web page;

evaluating the user information using validation logic to determine whether the user is the intended recipient of the offer based on whether the user information matches user information of the intended recipient;

determining, using the validation logic, that the offer is valid or invalid based on a geographic location of the user, an expiration date of the offer, and availability of the product;

displaying a decision web page on the GUI of the user device, the decision web page including an approval or denial for the user of the offer based on the evaluation and the determination; and upon determining that the user is not the intended recipient of the offer or that the offer is invalid, automatically providing access to the user to an additional offer tailored to the user.

18. The non-transitory computer-readable storage medium of claim 17, wherein the validation page includes an inquiry portion configured to determine if the user is a customer of a seller associated with the offer.

19. The non-transitory computer-readable storage medium of claim 18, wherein upon determining that the user is the customer of the seller, prompting the user on the GUI of the user device to log in to a corresponding user account with the seller.

20. The non-transitory computer-readable storage medium of claim 17, wherein the user information includes a zip code of a residence of the user.

* * * * *